United States Patent Office 3,211,795
Patented Oct. 12, 1965

3,211,795
PREPARATION OF MERCAPTO-PROPANOLS
Gayle D. Edwards, Austin, and George J. Laemmle, Port Arthur, Tex., assignors to Jefferson Chemical Company, Inc., Houston, Tex., a corporation of Delaware
No Drawing. Filed Oct. 9, 1961, Ser. No. 143,584
5 Claims. (Cl. 260—609)

This invention relates to the prepartion of mercapto-propanols. More particularly, this invention relates to the preparation of 3-(alkylmercapto)propanols from allyl alcohol and alkyl mercaptans.

It has heretofore been proposed to prepare 3-(alkylmercapto)propanols by the reaction of allyl alcohol with an alkyl mercaptan in the presence of a peroxide catalyst or in the presence of ultraviolet radiation. However, the results heretofore obtained have not been entirely satisfactory. For example, a poor yield is obtained in the case of a peroxide catalized reaction. With ultraviolet light, the inhibitors normally present in minor amounts in commercial allyl alcohol or alkyl mercaptans adversely affect the course of the reaction.

Accordingly, past results in the synthesis of 3-(alkylmercapto)propanols have left much to be desired.

It has now been surprisingly discovered, in accordance with present invention, that 3-(alkylmercapto)propanols can be obtained in good yield by reacting a $C_2$ to $C_8$ alkyl mercaptan with allyl alcohol in the presence of a catalytically effective amount of azodiisobutyronitrile.

The starting materials for the present invention are allyl alcohol, azodiisobutyronitrile and a $C_2$ to $C_8$ mercaptan such as ethyl mercaptan, n-propyl mercaptan, isopropyl mercaptan, n-butyl mercaptan, t-butyl mercaptan, amyl mercaptan, hexyl mercaptan, heptyl mercaptan, octyl mercaptan, etc., and mixtures thereof.

Normally, equimolar amounts of allyl alcohol and alkyl mercaptan will be employed, although either reactant may be used in a molar excess, if so desired. Thus, for example, from about 0.5 to about 1.5 mols of alkyl mercaptan may be employed per mol of allyl alcohol with the best results being obtained when substantially equimolar amounts are employed.

The amounts of azodiisobutyronitrile to be employed may be varied within comparatively wide limits. Thus, a catalytic effect is obtained when the azodiisobutyronitrile is present within the range from about 0.01 to about 1 wt. percent. However, it is generally desirable to utilize less than 1 wt. percent for economic reasons, and the best results will normally be obtained when the catalyst is employed so as to constitute from about 0.1 to about 0.15 wt. percent of the reaction mixture.

The reaction should be conducted at a temperature below the decomposition temperature of azodiisobutyronitrile, which is about 90° C. Thus, reaction temperatures within the range of about 30° to about 90° C. may be employed, with the best results being obtained at a reaction temperature within the range of about 80° to about 90° C.

The reaction may be conducted at atmospheric pressure or superatmospheric pressure and is preferably conducted in a closed system in order to minimize odors. In a closed system and under the reaction conditions set forth above, the maximum pressure encountered will normally be less than about 100 p.s.i.g. and will generally be within the range of about 45 to 50 p.s.i.g.

Reaction time may be varied within comparatively wide limits of from about 1 to about 10 hours, with the best results being obtained with a reaction time of about 4 to about 7 hours.

In accordance with the preferred embodiment of the present invention, the reaction is conducted in an inert atmosphere, such as an atmosphere of nitrogen, and in the absence of oxygen.

The invention will be further illustrated by the following specific examples which are given by way of illustration and not as limitations on the scope of this invention.

EXAMPLE I

A number of alkylmercapto-propanols were prepared by reacting allyl alcohol with an alkylmercaptan. In conducting each of the experiments, approximately equimolar amounts of alkyl mercaptan and allyl alcohol were employed with the designated catalyst. The mercaptan, allyl alcohol and catalyst were charged to a reactor. Heat was applied to give a gentle reflux. At the beginning the reaction temperature was approximately the boiling point of the mercaptan. Near the end of the reaction more heat was necessary to maintain refluxing. The reactants employed, the reaction conditions employed and the results obtained are set forth in Table I.

Table I.—Condensation of alkyl mercaptans with allyl alcohol in the presence of t-butyl hydroperoxide or azodiisobutyronitrile

| Mercaptan | Run No.[3] | Wt. Percent Cat. | Catalyst | Temp., °C. | Time, hrs. | Percent Yield |
|---|---|---|---|---|---|---|
| Mixed Amyl mercaptans | 1 | 4.95 | t-Butyl hydroperoxide | 95–100 | 8½ | 44 |
| Do | 2 | 1.55 | Azodiisobutyronitrile | 96–117 | 7¾ | 62 |
| Isopropyl mercaptan [1] | 3 | 0.37 | ----do---- | 60–125 | 1¼ | 84 |
| Do.[2] | 4 | 0.37 | ----do---- | 60–117 | 1½ | 80 |
| Do.[2] | 5 | 0.04 | ----do---- | 60–117 | 5¾ | 77 |
| Do.[2] | 6 | 0.15 | ----do---- | 60–102 | 6¾ | 82 |
| t-Butyl mercaptan | 7 | 0.15 | ----do---- | 52–89 | 8 | 68 |

[1] Commercial mercaptan was distilled.
[2] Mercaptan used as received.
[3] Runs 6 and 7 were 8 and 7 mol preparations respectively. Runs 1–5 were 1 mol preparations.

From Table I, it will be seen that a 50 to 100% increase in the yield of 3-(alkylmercapto)propanol was obtained through the use of azodiisobutyronitrile as compared with the known tertiary butyl hydroperoxide catalyst.

EXAMPLE II

In order to illustrate the effect of reaction temperature and oxygen on the reaction, a number of runs were made wherein the starting materials were equimolar amounts of allyl alcohol and isopropylmercaptan. The reaction conditions employed and the results obtained are set forth in Table II.

*Table II*

| Run * | 1 | 2 | 3 | 4 | 5 | 6 | 7 |
|---|---|---|---|---|---|---|---|
| Wt. percent catalyst | 0.04 | 0.04 | 0.2 | 0.1 | 0.15 | 0.04 | 0.1 |
| Temp., ° C | 90-115 | 90-115 | 90-115 | 70-80 | 80-90 | 80-90 | 80-90 |
| Time, hours | 2¼ | 6½ | 5 | 6 | 6 | 5¾ | 5 |
| Air replaced by nitrogen | No | No | No | No | Yes | Yes | Yes |
| Percent yield | 9 | 6 | 27 | 20 | 90 | 26 | 86 |

* Used an allyl alcohol/isopropyl mercaptan mol ratio of 1.1. The mercaptan was obtained from the Oronite Chemical Co. and was not distilled before use. The reactions were carried out in a chrome-steel rocking autoclave. The maximum pressure encountered was 45-50 p.s.i.g.

As will be observed from Table II, low yields were obtained when the reaction was conducted in a closed system in the presence of oxygen, or at a temperature above the decomposition temperature of azodiisobutyronitrile.

Having described our invention, what is claimed is:

1. A method for the preparation of 3-(alkylmercapto) propanols which consists of reacting an alkyl mercaptan containing two to eight carbon atoms in the molecule with allyl alcohol at a temperature within the range of about 30° to about 90° C. and a pressure within the range of about 45 to 100 p.s.i.g. in the absence of oxygen for a period of time within the range of about four to seven hours in the presence of from about 0.01 to about 1 wt. percent of azodiisobutyronitrile.

2. A method for the preparation of 3-(alkylmercapto) propanols which consists of reacting an alkyl mercaptan containing 2 to 8 carbon atoms in the molecule with about an equivalent amount of allyl alcohol at a temperature within the range of about 80° to about 90° C., and a pressure within the range of about 45 to 50 p.s.i.g. in the absence of oxygen for a period of time within the range of about 5 to 6 hours in the presence of from about 0.1 to about 0.15 wt. percent of azodiisobutyronitrile.

3. A method as in claim 2 wherein the alkyl mercaptan is isopropyl mercaptan.

4. A method as in claim 2 wherein the alkyl mercaptan is an amyl mercaptan.

5. A method as in claim 2 wherein the alkyl mercaptan is a butyl mercaptan.

References Cited by the Examiner

UNITED STATES PATENTS

| | | | |
|---|---|---|---|
| 2,392,294 | 1/46 | Rust et al. | 260—609 |
| 2,551,813 | 5/51 | Pinkney | 260—609 |
| 2,865,965 | 12/58 | May et al. | 260—609 |

OTHER REFERENCES

Bruin et al.: Rec. Trav. Chem., volume 71, 1952, pages 1115–1117.

Reid, Organic Chemistry of Bivalent Sulfur, volume II, Chemical Publishing Company, New York, 1960, page 208.

Walling: Free Radicals in Solution, John Wiley and Sons Inc., New York, 1957, pages 313–316.

CHARLES B. PARKER, *Primary Examiner.*

LEON ZITVER, *Examiner.*